(12) United States Patent
Celik et al.

(10) Patent No.: US 11,584,163 B2
(45) Date of Patent: *Feb. 21, 2023

(54) NON-PNEUMATIC SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 944 days.

This patent is subject to a terminal disclaimer.

(21) Appl. No.: 15/801,365

(22) Filed: Nov. 2, 2017

(65) Prior Publication Data

US 2019/0126684 A1 May 2, 2019

(51) Int. Cl.
*B60C 7/12* (2006.01)
*B60B 9/26* (2006.01)
*B60C 7/14* (2006.01)

(52) U.S. Cl.
CPC ............... *B60C 7/12* (2013.01); *B60B 9/26* (2013.01); *B60C 7/14* (2013.01)

(58) Field of Classification Search
CPC .... B60B 9/18; B60B 9/26; B60B 9/10; B60B 9/02; B60C 7/12; B60C 7/125; B60C 7/16; B60C 2007/146; B60C 7/14
See application file for complete search history.

(56) References Cited

U.S. PATENT DOCUMENTS

| 479,255 | A | | 7/1892 | Dunlop |
| 482,175 | A | | 9/1892 | Hollafolla |
| 1,002,003 | A | | 8/1911 | Simonson |
| 1,233,722 | A | | 7/1917 | Smith |
| 1,389,285 | A | | 8/1921 | Althoff |
| 1,402,190 | A | * | 1/1922 | Swinehart ................ B60C 7/10 152/326 |
| 1,451,517 | A | | 4/1923 | Smith |
| 1,930,764 | A | | 10/1933 | Mallory |
| 3,493,027 | A | | 2/1970 | Dewhirst |
| 4,093,299 | A | * | 6/1978 | Capps ....................... B60B 9/26 152/85 |
| 4,226,273 | A | | 10/1980 | Long |
| 4,235,270 | A | | 11/1980 | Kahaner |

(Continued)

FOREIGN PATENT DOCUMENTS

WO WO-2017072562 A1 * 5/2017 ........... B60B 1/0261

OTHER PUBLICATIONS

U.S. Appl. No. 15/351,672, filed Nov. 15, 2016.

(Continued)

*Primary Examiner* — Scott A Browne

(74) *Attorney, Agent, or Firm* — June E. Rickey; Robert N. Lipcsik

(57) ABSTRACT

A tire assembly transfers rotation about an axis from an outer flexible ring to an inner central rim. The tire assembly includes a spoke structure extending radially between the inner central rim and the outer flexible ring. The spoke structure defines a plurality of radially extending closed cavities and an alternating plurality of radially extending inlet openings disposed concentrically about the axis and allowing the flexible ring to deflect under load. The closed cavities extend axially and circumferentially at a helical angle relative to the axis.

9 Claims, 3 Drawing Sheets

(56) References Cited

U.S. PATENT DOCUMENTS

| | | | |
|---|---|---|---|
| 4,602,823 | A | 7/1986 | Berg |
| 5,343,916 | A | 9/1994 | Duddey |
| 5,800,643 | A | 9/1998 | Frankowski |
| 6,068,721 | A | 5/2000 | Dyer |
| 6,244,669 | B1 * | 6/2001 | Braunschweiler ........ B60B 9/02 |
| | | | 301/79 |
| 6,260,598 | B1 | 7/2001 | Tanaka |
| 8,962,120 | B2 | 2/2015 | Delfino |
| 9,180,732 | B2 * | 11/2015 | Endicott ............... B60B 1/0223 |
| 9,248,697 | B2 * | 2/2016 | Iwamura ................... B60B 1/06 |
| 2004/0069385 | A1 * | 4/2004 | Timoney ................... B60B 9/26 |
| | | | 152/69 |
| 2010/0193097 | A1 | 8/2010 | McNier |
| 2012/0205017 | A1 * | 8/2012 | Endicott ................. B60B 1/042 |
| | | | 152/1 |
| 2016/0096400 | A1 * | 4/2016 | Nomura .................... B60B 9/04 |
| 2017/0113489 | A1 * | 4/2017 | Iwamura ................. B60C 7/102 |
| 2017/0113490 | A1 * | 4/2017 | Iwamura .................. B60C 7/18 |

OTHER PUBLICATIONS

U.S. Appl. No. 15/351,687, filed Nov. 15, 2016.
U.S. Appl. No. 15/351,706, filed Nov. 15, 2016.
U.S. Appl. No. 15/351,717, filed Nov. 15, 2016.
U.S. Appl. No. 15/351,727, filed Nov. 15, 2016.
U.S. Appl. No. 15/465,639, filed Mar. 22, 2017.

* cited by examiner

NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A tire assembly in accordance with the present invention transfers rotation about an axis from an outer flexible ring to an inner central rim. The tire assembly includes a spoke structure extending radially between the inner central rim and the outer flexible ring. The spoke structure defines a plurality of radially extending closed cavities and an alternating plurality of radially extending inlet openings disposed concentrically about the axis and allowing the flexible ring to deflect under load. The closed cavities extend axially and circumferentially at a helical angle relative to the axis.

According to another aspect of the tire assembly, the helical angle is in the range between 0° and 45°.

According to still another aspect of the tire assembly, each of the closed cavities extends at the helical angle.

According to yet another aspect of the tire assembly, each cavity of the plurality of closed cavities has a common radial dimension.

According to still another aspect of the tire assembly, each cavity of the plurality of closed cavities has a common length equal to a uniform axial thickness of the spoke structure divided by the cosine of the helical angle.

According to yet another aspect of the tire assembly, a reinforcing layer is interlaced circumferentially and radially about the plurality of cavities and the plurality of alternating extending openings for further tuning the flexibility/stiffness of the spoke structure.

According to still another aspect of the tire assembly, the spoke structure comprises a uniform rubber material.

A method in accordance with the present invention non-pneumatically supports a mobile vehicle. The method comprises the steps of: extending a spoke structure axially and radially between an inner central rim and an outer flexible ring; rotating the spoke structure about an axis; defining a plurality of axially and circumferentially extending cavities and alternating radially and circumferentially extending openings concentrically about the inner central rim; and vertically loading the flexible ring such that the flexible ring and a part of the spoke structure adjacent to the flexible ring both deflect vertically.

According to another aspect of the method, the cavities and opening form a helical angle relative to the axis.

According to still another aspect of the method, the helical angle is in the range between 0° and 45°.

According to yet another aspect of the method, each of the closed cavities extends at the helical angle.

According to still another aspect of the method, each cavity of the plurality of closed cavities has a common radial dimension.

According to yet another aspect of the method, each cavity of the plurality of closed cavities has a common length equal to a uniform axial thickness of the spoke structure divided by the cosine of the helical angle.

According to still another aspect of the method, further steps include tuning the flexibility/stiffness of the spoke structure and interlacing a reinforcing layer circumferentially and radially about the plurality of cavities and plurality of alternating openings.

According to yet another aspect of the method, the spoke structure comprises a uniform rubber material.

According to still another aspect of the method, a further step includes buckling part of the spoke structure at a predetermined vertical load on the spoke structure.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

Figure 1:
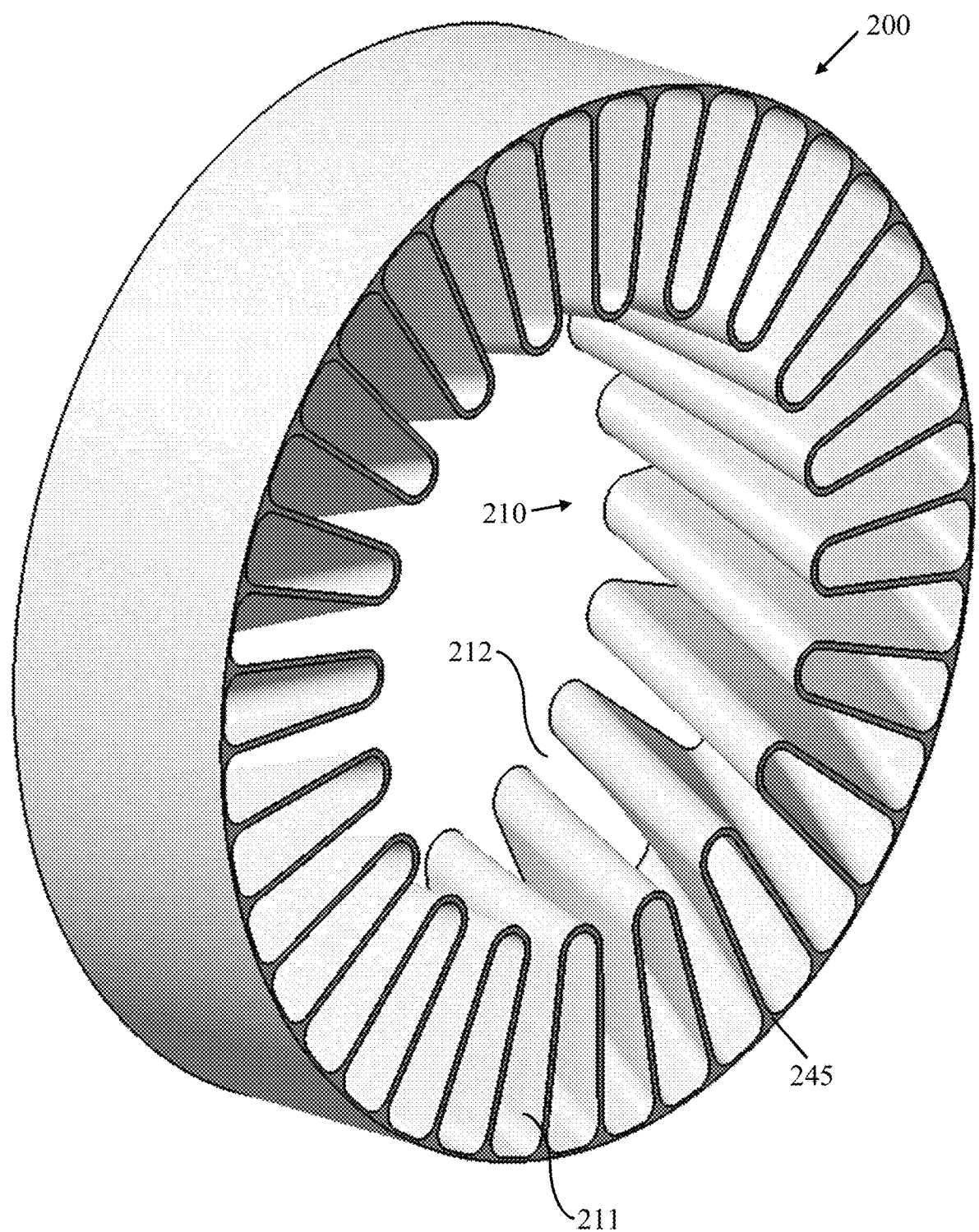
FIG. 1 is a schematic perspective view of an example assembly in accordance with the present invention.

A conventional wheel/tire assembly, such as that described in U.S. application Ser. No. 15/351,672 to applicant Goodyear and inventor C. Celik, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers 245. The layer(s) 245 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The reinforcement 245 may be oriented at angle between 0 degrees and 90 degrees. The spokes may be continuously reinforced across their entire axial length. Continuous reinforcement layer(s) 245 may extend radially outward to multiple locations adjacent to a shear band at the outer flexible ring.

Each cavity may have a common cross sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale assemblies. The inner central rim may include steel, cast iron, aluminum, aluminum alloys, magnesium allows, and/or iron alloys.

Another conventional wheel/tire assembly, such as that described in U.S. application Ser. No. 15/465,639 to applicant Goodyear and inventor C. Celik, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, which may include a shear band and tread structure, mounted on the inner central rim by a continuous cord/fabric reinforced spoke structure extending between the inner central rim and the outer ring.

The spoke structure may define a plurality of alternating cavities and inlet openings disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers 245. The layer(s) 245 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The reinforcement 245 in the spokes may be oriented at angle between 0 degrees and 90 degrees. The spokes may be continuously reinforced across their entire axial length. Continuous reinforcement layer(s) 245 may extend radially outward to multiple locations adjacent to a shear band at the outer flexible ring.

Each cavity and inlet opening may have a common cross sectional profile about the axis of rotation of the assembly. Further, each cavity and inlet opening may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale assemblies. The inner central rim may include steel, cast iron, aluminum, aluminum alloys, magnesium allows, iron alloys, plastics, and/or composites. The spoke structure may further have additional cavities for further adjusting the flexibility of the spoke structure.

Figure 2:
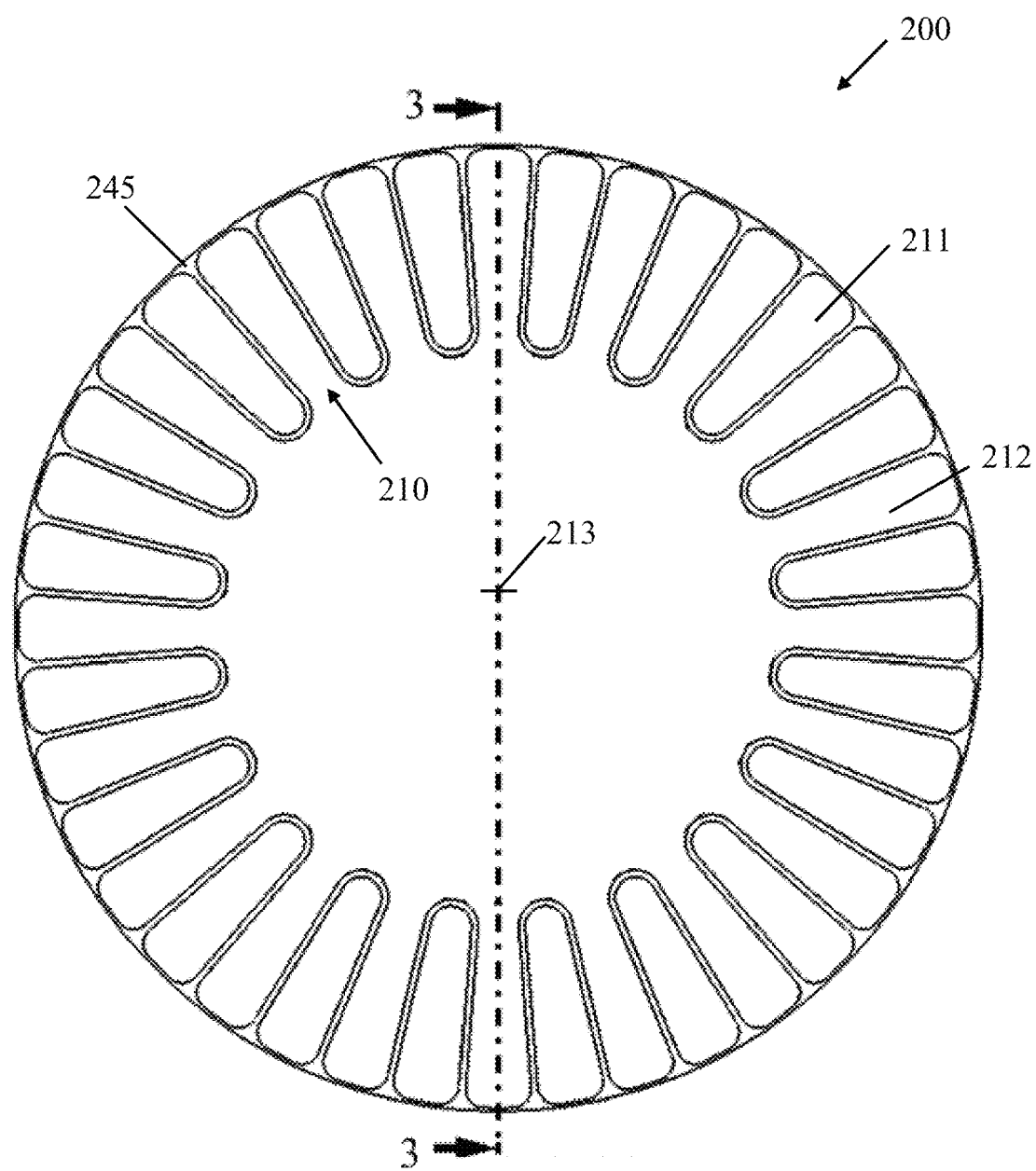
FIG. 2 is a schematic side view of the assembly of FIG. 1.
Figure 3:
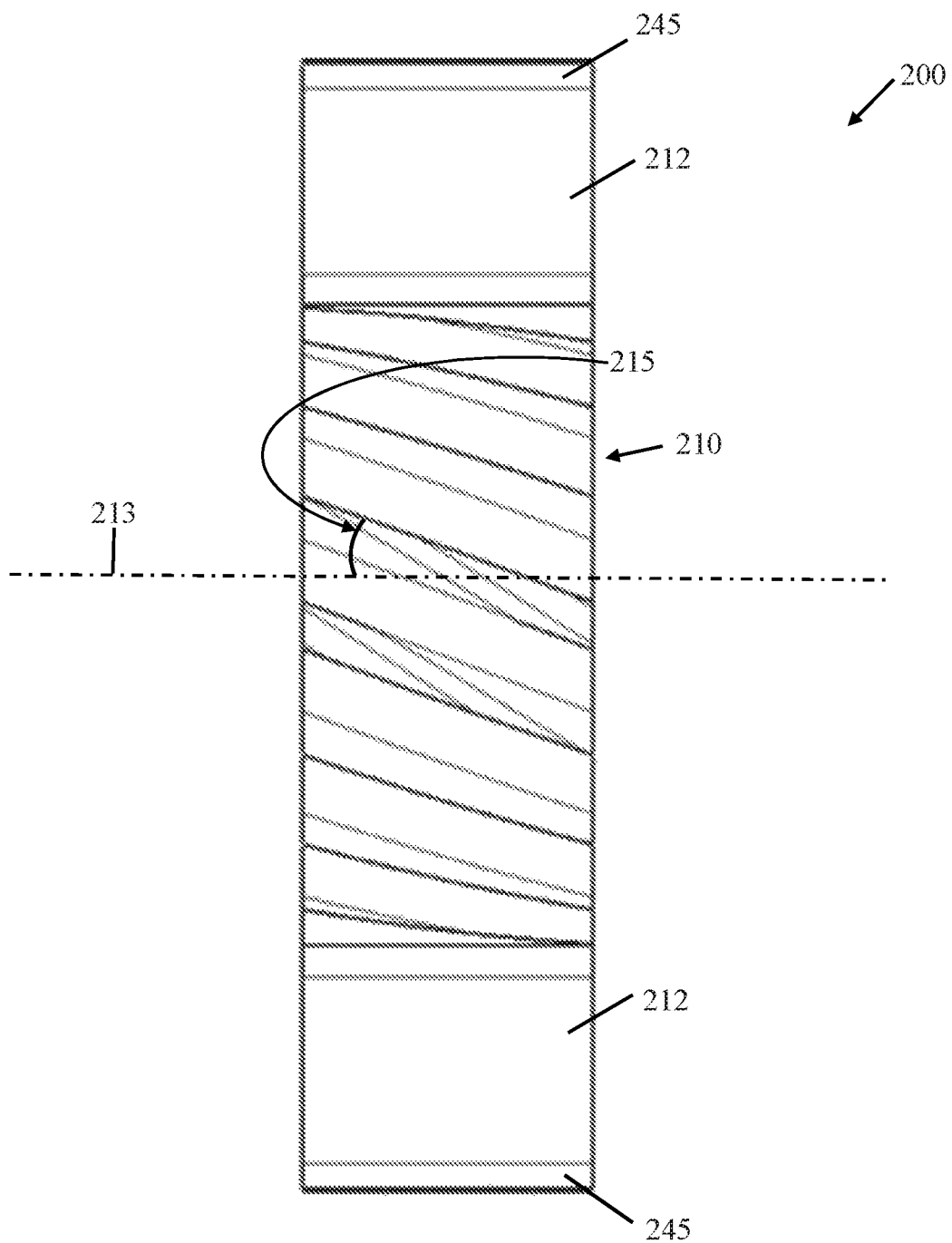
FIG. 3 is a schematic section view taken along line "3-3" in FIG. 2.

As shown in FIGS. 1-3, an example tire assembly 200 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 200 may have an inner central rim (not shown), such as an automobile wheel as described above, and a circular outer flexible ring (not shown), which may include a shear band with a tread structure, mounted on the inner central rim by a continuous cord/fabric reinforced spoke structure 210 extending between the inner central rim and the outer flexible ring.

As shown in FIGS. 1-3, a spoke structure 210 in accordance with the present invention may define a plurality of alternating rectangular closed cavities 211 and rectangular inlet openings 212 rotating concentrically about a rotational axis 213 thereby allowing the spoke structure 210 to deflect under load and define a suitable balance between flexibility for ride comfort and traction within a footprint of the assembly 200 and stiffness for vehicle handling, low rolling resistance, and low heat build-up within the spoke structure. The cavities 211 of the spoke structure 210 may further define openings for arms of the inner central rim to extend therethrough and secure the spoke structure to the inner central rim, as described above. The arms may engage portions of the spoke structure 210 in a mechanical interlocking arrangement. The inner central rim may further include plates that, along with the arms, may sandwich portions of the spoke structure 210 and create a further frictional and/or adhesive securement between the inner central rim and the spoke structure. The spoke structure 210 may comprise a homogenous or heterogeneous polymer and/or a filled polymer.

The alternating cavities 211 and inlet openings 212 may be formed such that each of the cavities and inlet openings form a helical angle 215 relative to the rotational axis 213 of the assembly 200 (FIG. 3). The helical angle 215 made be in the range from 0° to 45°. Thus, the cavities 211 and inlet openings 212 may extend axially, radially, and circumferentially relative to the rotational axis 213.

Such a construction of the assembly 200 may improve uniformity and reduce noise generation during use. The helical spoke structure 210 may gradually buckle and then gradually stretch or tension while entering and leaving a footprint while the assembly rotates. This gradual buckling and tensioning may contribute to the reduction of noise generation. Since the spoke structure 210 contacts the shearband in both lateral and longitudinal directions, uniformity may be improved. Further, durability may be improved by a self cooling feature caused by the helical spoke structure 210 moving, or pumping, air from one side of the assembly to the other side of the assembly as the spoke structure buckles and tensions during use.

The spoke structure 210 may be curved inwardly or outwardly for mitigating or enhancing buckling of the spoke structures (not shown). The spoke structure 210 may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spoke structure 210 may be oriented at angle between 0 degrees and 90 degrees. The spoke structure 210 may be continuously reinforced across its entire axial length. Continuous reinforcement layer(s) may extend radially outward to multiple locations adjacent to the shear band at the outer flexible ring. Other reinforcement layers may extend about the interior of the closed cavities 211. The continuous reinforcement layer(s) may be integrated into the spoke structure 210 and the outer flexible ring. Alternatively, the shear band may be attached to the spoke structure 210 by between 10 and 40 connection points (e.g., adhesive, fused, welded, etc.).

Each cavity 211 and inlet opening 212 may have a common cross sectional profile, respectively, about the rotational axis 213 of the assembly 200. Further, each cavity 211 and inlet opening 212 may have a common axial length, respectively, equal to a uniform axial thickness of the spoke structure 210. Each cavity 211 may be curvedly shaped to prevent "pinch" points on the reinforcement layer(s) and mitigate compressive stress concentrations on the reinforcement layer(s). The number of cavities 211 may be between 2 and 60 for large scale assemblies 200.

Variations in the present invention are possible in light of the description of examples provided herein. While certain representative examples and details have been shown for the purpose of illustrating the subject invention, it will be apparent to those skilled in this art that various changes and modifications can be made therein without departing from the scope of the subject invention. It is, therefore, to be understood that changes may be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A tire assembly for transferring rotation about an axis from an outer flexible ring to an inner central rim, the tire assembly comprising:
    a spoke structure extending radially between the central rim and the flexible ring, the spoke structure defining a plurality of radially extending closed cavities and an alternating plurality of radially extending inlet openings disposed concentrically about the axis and allowing the flexible ring to deflect under load, each of the closed cavities extending axially and circumferentially at a common helical angle relative to the axis,
    the spoke structure being attached to the outer flexible ring by between 10 and 40 connection points, each of the plurality of radially extending closed cavities being curvedly shaped to prevent pinch points on the spoke structure, the spoke structure having a continuous reinforcement layer extending radially outward to multiple locations adjacent to the outer flexible ring.

2. The tire assembly as set forth in claim 1 wherein the helical angle is in the range between 0° and 45°.

3. The tire assembly as set forth in claim 1 wherein each cavity of the plurality of closed cavities has a common length equal to a uniform axial thickness of the spoke structure divided by the cosine of the helical angle.

4. The tire assembly as set forth in claim 1 wherein the spoke structure comprises a uniform rubber material.

5. A method for non-pneumatically supporting a mobile vehicle comprising the steps of:
    extending a spoke structure axially and radially between an inner central rim and an outer flexible ring;
    extending a continuous reinforcement layer radially outward to multiple locations adjacent to the outer flexible ring;
    rotating the spoke structure about an axis;
    defining a plurality of axially and circumferentially extending cavities and alternating radially and circumferentially extending openings concentrically about the inner central rim;
    extending each of the cavities and the openings axially and circumferentially at a common helical angle relative to the axis;
    vertically loading the flexible ring such that the flexible ring and a part of the spoke structure adjacent to the flexible ring both deflect vertically;
    attaching the spoke structure to the outer flexible ring by between 10 and 40 connection points; and
    curvedly shaping each of the plurality of axially and circumferentially extending cavities to prevent pinch points on the spoke structure.

6. The method as set forth in claim 5 wherein the helical angle is in the range between 0° and 45°.

7. The method as set forth in claim 6 wherein each cavity of the plurality of closed cavities has a common length equal to a uniform axial thickness of the spoke structure divided by the cosine of the helical angle.

8. The method as set forth in claim 5 wherein the spoke structure comprises a uniform rubber material.

9. The method as set forth in claim 5 further including the step of buckling part of the spoke structure at a predetermined vertical load on the spoke structure.

* * * * *